Patented Jan. 19, 1937

2,067,913

UNITED STATES PATENT OFFICE 2,067,913

PROCESS OF MAKING LICORICE MASS

William L. Geddes, Sussex, N. Y., assignor to MacAndrews and Forbes Company, Camden, N. J., a corporation of New Jersey No Drawing. Application March 7, 1935, Serial No. 9,915

4 Claims. (Cl. 99—140)

This invention relates to the formation of licorice blocks or briquettes known as licorice mass, the object of the invention being to provide an improved product and a novel method of making the same. The product produced by the invention is characterized by the fact that it is composed of coalesced solid licorice particles forming a homogeneous mass or structure. By the method of the invention solid licorice particles are coalesced by molding under pressure. More particularly the method is characterized by the use of pressure alone without heat or a binder.

The practice which has become more or less standard in the manufacture of licorice mass is as follows:

An aqueous licorice extract is first prepared from the licorice root by any standard method, the solid content of such extract ranging from 5% to 12%. The aqueous extract is then placed in a vacuum pan evaporator, such as the commonly known "triple effect" evaporator with a vacuum reaching twenty-four inches of mercury, and is concentrated by this treatment until the solid content is between 25% and 50%. The concentrated extract is then placed in a steam jacket kettle at atmospheric pressure and is further concentrated until the solid content is brought up to 75% to 85%. This material which is still liquid is then poured into paper-lined molds and is allowed to solidify. The final moisture content of the product varies from 15% to 25%. The licorice blocks, known as licorice mass, are taken from the molds and are ready for sale, the blocks varying from 10 lbs. to 260 lbs. in weight.

By the present invention, the method described is simplified and an improved product is obtained. In accordance with the invention, the concentrated extract is taken from the vacuum pan evaporator and is dried in any suitable manner which will furnish solid licorice in finely-divided or flaky particles. Preferably, the liquid is run over drum driers to reduce the moisture content to from 3% to 10%, although it can be lower. With a moisture content higher than 10%, difficulty is often encountered since the product tends to remain liquid on the drum driers. The drum drier may be operated at atmospheric pressure or may be enclosed and operated under vacuum as is the case with the usual vacuum drum drier. In the event the atmospheric drier is employed, the drum is preferably heated by steam at a pressure varying from 15 lbs. to 50 lbs. per square inch. A knife which operates in contact with the drum serves to scrape off the solid material in the form of flakes. The drying step may be carried out in any other suitable manner, for example by a spray-drying process.

The powdered or flaky material is placed in a suitable press containing a mold of the shape and size desired in the finished block or mass. The press may be either a hydraulic press or a mechanical lever press furnishing the necessary pressure. The pressure may vary widely, for example, from 5000 lbs. per square inch up to 12,000 lbs. per square inch. In order to facilitate removal of the mass or briquette from the mold, the mold surfaces are preferably highly polished so as to prevent irregularities of the surfaces which might make removal difficult. A mold with collapsible sides may be used if desired.

The blocks obtained from the press are dull and brownish in color, in contradistinction to the lustrous black product previously obtained. If it is desired to market blocks similar in appearance to the prior licorice mass, the blocks may be moistened on the surface, preferably by subjecting them to steam supersaturated at atmospheric pressure. The blocks need be subjected to the treatment for only a fraction of a minute, ten seconds usually being sufficient. The moisture is absorbed locally and the dull, brown block is converted into a lustrous, black product.

The product produced by this method is composed of coalesced solid particles and the solid mass has a homogeneous structure. The coalescence of the solid particles, giving the desired homogeneous structure, is brought about by molding under pressure. As is to be seen from the specific example, this is accomplished without the aid of heat or a binder. There is no reduction in the moisture content of the mass during molding. The licorice mass is somewhat elastic and after removal from the mold, it is somewhat larger than when confined in the mold. This process is to be contrasted with prior practice where the mass is merely obtained upon cooling the concentrated liquid and in which no pressure molding of solid particles is involved.

Although the method contemplated by the invention has been described herein with particular reference to a preferred form, it will be understood that modifications are possible within the scope of the invention and without departing therefrom.

What I claim is:

1. The herein described process of making licorice mass, which comprises preparing a concentrated licorice extract, drying the extract to obtain finely divided solid licorice particles, and molding the solid particles under pressure to cause coalescence thereof.

2. The herein described process of making licorice mass, which comprises preparing a concentrated licorice extract, drying the extract to obtain finely divided solid licorice particles, and molding the solid particles in the absence of heat or a binder to coalesce the particles by pressure alone.

3. The herein described process of making licorice mass, which comprises preparing a concentrated licorice extract, drying the concentrated extract to lower the moisture content thereof below 10% and to obtain finely divided solid licorice particles, and molding the solid particles in the absence of heat or a binder to coalesce the particles by pressure alone.

4. The herein described process of making licorice mass, which comprises preparing a concentrated licorice extract, drying the extract to obtain finely divided solid licorice particles, molding the solid particles in the absence of heat or a binder to coalesce the particles by pressure alone, and thereafter subjecting the surfaces of the molded product to moisture to give a lustrous, black appearance thereto.

WILLIAM L. GEDDES.